United States Patent [19]
Kotaki

[11] Patent Number: 6,010,238
[45] Date of Patent: Jan. 4, 2000

[54] EMBROIDERY DATA GENERATING SYSTEM

[75] Inventor: Kenji Kotaki, Kishiwada, Japan

[73] Assignee: Shima Seiki Manufacturing, Ltd., Wakayama, Japan

[21] Appl. No.: 08/699,385

[22] Filed: Aug. 19, 1996

[30] Foreign Application Priority Data

Aug. 22, 1995 [JP] Japan ................................ 7-213128

[51] Int. Cl.⁷ ........................... G06F 19/00; D05B 21/00
[52] U.S. Cl. ................................ 364/470.09; 112/102.5
[58] Field of Search ............................ 112/78, 82, 439, 112/475.18, 102.5; 83/910; 364/470.01, 470.02, 470.06, 470.07, 470.08, 470.09

[56] References Cited

U.S. PATENT DOCUMENTS

| | | | |
|---|---|---|---|
| 4,998,489 | 3/1991 | Hisatake et al. | 112/103 |
| 5,343,401 | 8/1994 | Goldberg et al. | 364/470.09 |
| 5,379,707 | 1/1995 | Asano | 112/102.5 |
| 5,390,126 | 2/1995 | Kongho et al. | 364/470.09 |
| 5,558,031 | 9/1996 | Muto et al. | 112/102.5 |
| 5,646,861 | 7/1997 | Kotaki | 364/470.09 |
| 5,648,908 | 7/1997 | Chirn et al. | 364/470.06 |

OTHER PUBLICATIONS

Patent Abstracts of Japan, vol. 017, No. 655, Dec. 6, 1993, and JP 05 212171A.
Patent Abstracts of Japan, vol. 016, No. 461, Sep. 25, 1992, and JP 04 164483A.
Patent Abstracts of Japan, vol. 016, No. 198, May 13, 1992, and JP 04 030893A.

*Primary Examiner*—William Grant
*Assistant Examiner*—Steven R. Garland
*Attorney, Agent, or Firm*—Nikaido, Marmelstein, Murray & Oram LLP

[57] ABSTRACT

The center line of an embroidery region is determined. Starting from one point on the center line, search is made to search for end points and branch points on the center line. At branch points, bisectors for spaces between branches are generated to divide the embroidery region into plural closures. Near the end point, the orientation of the embroidery lines is determined to be perpendicular to the center line. Near the branch point, the orientation of the embroidery lines is determined to be parallel to a line connecting the intersection points of the bisectors and the outline. Embroidery data are obtained by fill operation, and the orientations of the respective embroidery lines are set to interpolate the above-mentioned two orientations. The needle points are determined on the outline. Near the branches, the needle points are determined on a closer side on the outline or said bisector.

8 Claims, 7 Drawing Sheets

EMBROIDERY DATA GENERATING SYSTEM

FIELD OF THE INVENTION

The present invention relates to formation of embroidery patterns on fabrics such as cloth and garment with embroidery stitches. In particular, the present invention relates to an embroidery data generating system for generating embroidery data that specify the relative positions of the embroidery needles moving vertically to embroider and a fabric to be embroidered, such embroidery data are used to control, for example, an embroidery machine.

Prior Art

Known prior art includes the systems disclosed by the Japanese Provisional Patent Hei 3-861 and the Japanese Provisional Patent Hei 5-212171.

The Japanese Provisional Patent Hei 3-861 discloses an embroidery data generating system for an embroidery machine. In the system, the first computing means divides an embroidery pattern into plural regions by lines parallel to an embroidery orientation, on the basis of the outline of the embroidery pattern and the inputted orientation of the embroidery lines. Then the means computes outline data showing the outlines of the respective regions. The second computing means computes needle location data and the like for embroidering the regions, on the basis of the outline data computed by the first computing means and the embroidery orientation data.

In the Japanese Provisional Patent Hei 5-212171, an embroidery region dividing means divide an embroidery region enclosed by an outline specified by an outline specifying means into plural closures. In dividing the embroidery region, the dividing means considers certain characteristic points identified on the outline by a characteristic point identifying means and a basic orientation specified by a basic orientation determining means. An embroidery route determining means determines the embroidery routes over the entire region, on the basis of the closures, outline and basic orientation.

The above-mentioned embroidery data generating systems disclosed by the Japanese Provisional Patent Hei 3-861 and the Japanese Provisional Patent Hei 5-212171 input data of numerous embroidery lines for a region by means of an algorithm called fill operation rather than manual input by an operator, to automatically fill in the region with embroidery lines. For example, if these systems make a fill operation of an embroidery region D shown in FIG. 8, the systems divide, according to an embroidery orientation E-F, the region of the embroidery region D into two parts with a dividing line a-b, and generate embroidery data so that the entire closures are filled in with embroidery lines along the singe embroidery orientation E-F. The embroidery data generated by these systems, however, result in an inferior appearance and, in turn, a low marketability of the product because the orientation of the embroidery lines is singular over the entire closures.

It, therefore, is necessary to generate embroidery data that form embroidery lines, not in a singe embroidery orientation like those of the data generated by the above-mentioned fill operation, but matched to the orientations of the respective regions of the embroidery regions. To this end, in the case of the conventional embroidery data generating systems, it is necessary for an operator to input plural embroidery orientations Gn-Hn as shown in FIG. 9. Moreover, division of a region can not be done with the embroidery orientation alone. When a region is to be divided into plural regions, orientations of regions must be considered.

This work of inputting data for division into closures and the embroidery orientations requires much time, the work efficiency is very low, and the work requires skill.

SUMMARY OF THE INVENTION

The objective of the present invent ion is to automatically fill in an embroidery region with embroidery lines suited to the form of the embroidery region, and in particular, when the embroidery region is branched, to change the directions of the embroidery lines or the embroidery orientations according to the branch and determine the orientations of the embroidery lines so that the shapes of the outline in the respective embroidery region portions are reflected in the orientations of the embroidery lines. The secondary task of the present invention will become evident from the following description.

The embroidery data generating system of the present invention is for determining needle points of embroidery lines relative to the embroidery region and comprises an outline data generator for determining the outline of the embroidery region, a means for computing characteristic lines that are present inside the outline obtained and interpolate the orientations of the opposing portions of the outline, a branch and end points search unit for searching for branch points and end points on the characteristic lines obtained, a closure generator for dividing the embroidery region into plural closures by means of dividing lines that divide the embroidery region near the branch points searched for, an orientation determiner for computing the embroidery orientation, at least for some positions, for example, substantially perpendicular to the above-mentioned characteristic lines, and a needle point determiner for determining needle points of the embroidery lines, on the basis of the embroidery orientations obtained and said outline and said dividing lines.

Preferably, the means for computing the characteristic lines computes the center lines of the outline.

Preferably, the closure generator generates the bisector of adjacent center lines near said branch point to make the bisector said division line.

Preferably, the closure generator computes intersection points of the dividing lines and the outline.

Preferably, the closure generator seeks to start the dividing line from a branch point, and seeks to identify an intersection, along the dividing line, with another graphical characteristic, starting from the branch point, and when the first intersection is not with the outline, the closure generator will rotate said dividing line, around said branch point, till the first intersection is with the outline. As a result, the dividing line starting from the branch point first intersects with the outline. Thus any division of the region with an intersection between a dividing line and another dividing line or between a dividing line and a characteristic line can be avoided. This is important for complicated embroidery patterns with many branches.

Preferably, the orientation determiner determines the orientations of embroidery lines on at least two points on a characteristic line in a closure, and for at least one of the points, determines the orientation on the basis of the orientation of the characteristic line near the point, and determines the orientations of embroidery lines at other positions so that they interpolate the two embroidery orientations.

Furthermore, preferably, the orientation determiner determines the embroidery orientation to be substantially perpendicular to the characteristic line on at least one of the above-mentioned points.

Preferably, the orientation determiner determines the first embroidery orientation, on at least one point on the characteristic line in the closure, for example, on a point near the end point, to be substantially perpendicular to the characteristic line. The orientation determiner also seeks two intersection points near the branch point with the dividing line and the outline, establishes the direction between said two intersection points as the second embroidery orientation, and determines the orientations of embroidery lines at other positions so that they interpolate these first and second embroidery orientations.

The operation and merits of the present invention will be described in the following. The objective of generation of embroidery data is to control the needle of the embroidery machine, and to designate in sequence the points in which stitches are formed by the embroidery needle or needle points. The positioning of cloth, garment, etc. relative to the embroidery machine is assumed to be made separately.

Inputting of embroidery patterns or embroidery regions is done by scanning a pattern sheet on which embroidery patterns are drawn with a scanner, or by drawing embroidery patterns on the screen with a digitizer, a stylus, etc. Hence the outline of the embroidery pattern can be determined with ease. Next, according to the present invention, characteristic lines are determined from the outline. The characteristic lines are limited to those present inside the outline. Various portions of the outline of an embroidery region are opposed to each other, and the orientation of a characteristic line is determined to interpolate the orientations of these opposing portions. A preferable characteristic line is the center line of the outline. The center line can be obtained by, for example, laying narrow bands, starting from the outline towards the inner side of the region, till the narrow bands of both side touch with each other. Thus the center line is located at the center of the opposing outline portions, and the orientation of the center line is the average of the orientations of the opposing outline portions. When the center line is used in determining the embroidery orientation, the orientation of the outline will be automatically reflected in the orientation of the embroidery lines. When the outline is curved, the orientation of the embroidery lines will be automatically changed accordingly as a matter of course.

Characteristic lines may take many other forms in addition to the center line. For instance, the pitch of laying a narrow band on one side of the outline is set at a relative value of 2, and the pitch of laying a narrow band on the other side of the outline is set at a relative value of 1. Then the resulting characteristic line interiorly divides the space between the two outline portions at approximately 2:1. Hence there is no need for the characteristic line to be at the center of the outline. Moreover, there is no need of interpolating the orientations of the opposing outline portions at 1:1. However, for any characteristic lines other than the center line, it is necessary to specify the ratio of narrow bands or the like for each region. If one fails to specify these ratios, the center line will be obtained. Characteristic lines other than the center line are variations of the center line.

When the region is a true circle, the center line is theoretically reduced to a point at the center of the circle. In this case, the embroidery orientation is the orientation from the center of the circle to the respective points of the outline or radial orientations, and the needle points are, for example, the center of the circle and the respective points on the circle.

In an embodiment to be described later, the true circle is not considered as the outline of any embroidery region. However, when a true circle is the outline, one can detect that the outline is a true circle from that the center line is reduced to one point, then one can alter the needle points from two points on the opposing outline portions to one point on the circle and the center of the circle.

Vertexes on the characteristic lines are of three kinds, branch point, end point and bend point. Of these, the important points are of two kinds, branch point and end point. These points are determined by starting from one vertex to trace the characteristic line, and its algorithm is shown, for example, in FIG. 3. Of particular importance here is the branch point, there the embroidery region branches, and in consequence, the embroidery orientation needs to be a altered, for example, in a discontinuous manner. For instance, in FIG. 8, the problem is that, although the embroidery region is branched, the embroidery orientation is common all over the region. To cope with it, when a branching is detected, the embroidery region is divided into plural closures by means of dividing lines and the orientations of the embroidery lines are altered. In this specification, a closure means a small region resulting from division of an embroidery region with a dividing line or lines.

Bend points need a supplementary explanation. For example, in the case of the letter F, its characteristic line has three end points, one branch point and one bend point. In this case, the bend point is treated as a branch point in the broader sense, and a dividing line may be generated at the bend point. Or as is the case of the embodiment, the bend point may be specified to the user as a determining point of the embroidery orientation.

Next, for the respective closures, needle points are determined on the outline and the like by considering the orientation of the characteristic line, etc. For example, for one or more points on the characteristic line of a closure, the embroidery orientation is determined, preferably, substantially perpendicular to the orientation of the characteristic line near the point. The actual embroidery lines are of zigzag pattern, and there is no significance of defining the orientation strictly perpendicular to the orientation of the characteristic line. Deviation of, for example, about ±10 degrees from the perpendicular line may be tolerated. For simplicity, let us consider a case without any branch point. For example, at two end points, the embroidery orientations may be determined to be substantially perpendicular to the characteristic line. For other locations, the above-mentioned two orientations may be smoothly interpolated. For the outer side of an end point, the changes in the embroidery orientations between the above-mentioned two points may be extrapolated to the outer side of the end point. Many of the actual embroidery regions have branches, and in such cases, at one end point, etc. of the characteristic line of a closure, the first embroidery orientation is determined, for example, substantially perpendicular to the characteristic line. Next, near the branch, the direction connecting two intersection points of the dividing line and the outline are determined, and the second embroidery orientation, for example, substantially parallel to that direction, is determined. For other locations, the orientations of the embroidery lines are interpolated in a similar manner. The needle points are set, for example, on the outline and the dividing line. The needle point near the branch point is, in principle, one closer to the characteristic line between the dividing line and the outline. Detection of the closer point can be done, for example, by computing the coordinates of the intersection points of the dividing line and the outline.

Dividing lines are not limited to those passing branch points, but preferably, dividing lines are set to pass branch points, and preferably, dividing lines are set to angularly bisect the branched center line or characteristic line. Dividing lines are, in principle, straight lines. The variation in this case is to make the user set the start position of a dividing line at any point other than the branch point. If no designation is given, the branch point will be the starting point of the dividing line. Such a designation enables the user to modify the shape of a closure according to his or her taste. This can be done by asking the user, in the step s7 of the embodiment (FIG. 2), about the start position of the dividing line.

When embroidery forms are complicated, the dividing line may intersect or collide against another dividing line or another center line before it intersects the outline. Since such a division mar the appearance of the embroidery, it is desirable, whenever a collision is detected, to turn the direction of the dividing line to avoid the collision. To this end, it is desirable, for the convenience of processing, to compute the coordinates of the intersection points of the dividing line and the outline as described above.

Near a branch, it is desirable to determine the embroidery orientation on the basis of intersection points of the dividing line and the outline. For one closure, there are two intersection points near a branch, and for example, the direction connecting these two intersection points may be set as the embroidery orientation near the branch. For another position or more positions, for example, near one end point of the characteristic line of a closure, the embroidery orientation is determined substantially perpendicular to the characteristic line in that position, and the respective orientations of the embroidery lines are set to interpolate these two orientations.

As described above, according to the present invention, one can obtain embroidery data wherein the orientations smoothly change according to the configuration of the embroidery region and branching of the region is taken into consideration.

EMBODIMENTS

Figure 1:
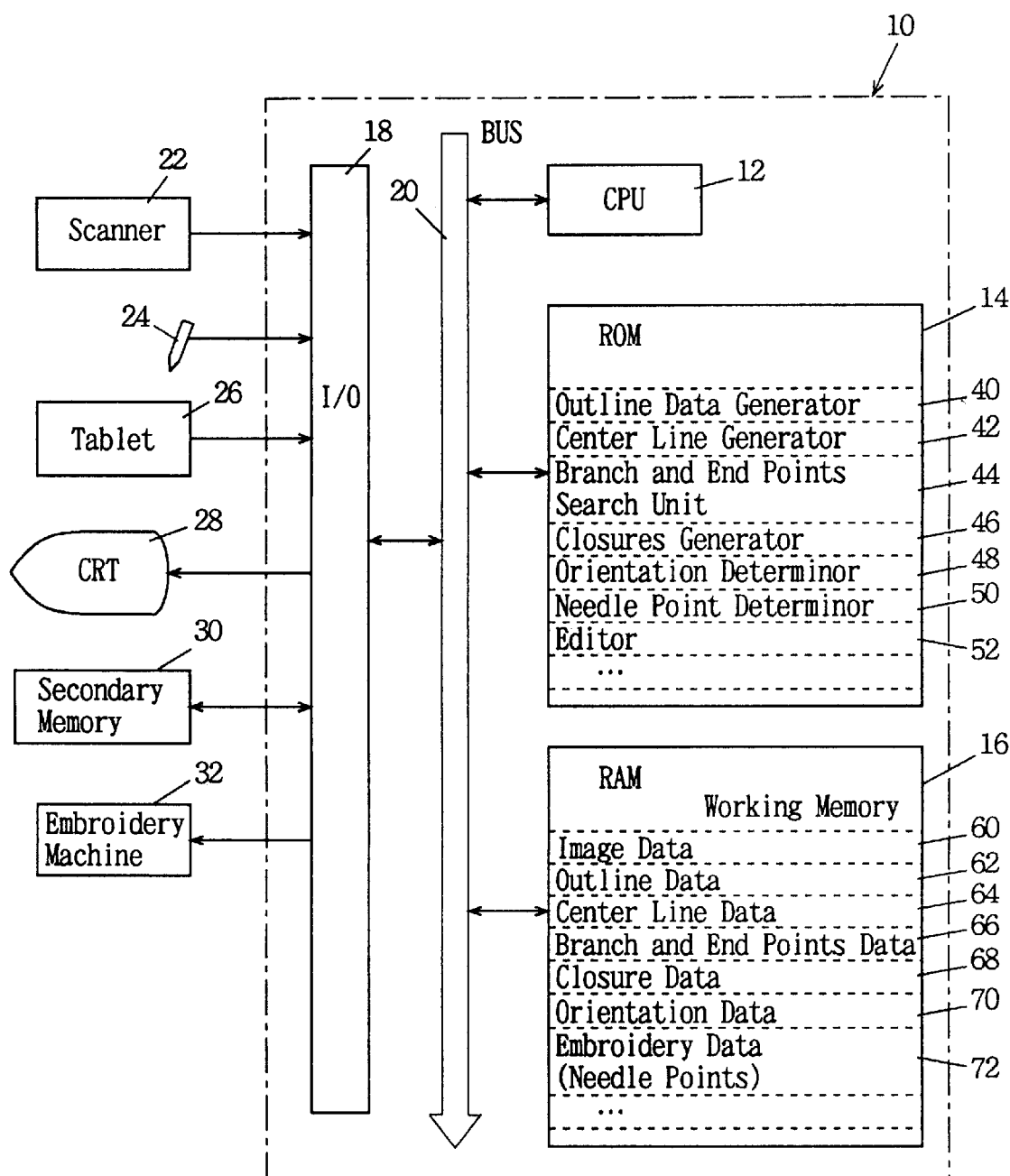
FIG. 1 A block diagram showing the configuration of an embroidery data generator of an embodiment of the present invention.

With reference to the drawings, one embodiment of the present invention will be described below. FIG. 1 is a diagram showing the configuration of an embroidery data generator according to the present invention. 10 is an embroidery data generator comprising a computer which, in turn, consists of a CPU 12 for various data processing, a ROM 14 storing various programs, a RAM 16 having readable and writable working memory, an I/O controller 18, a bus 20, etc. To the I/O controller 18 are connected a scanner 22 for scanning original drawings or the like of embroidery patterns, a stylus 24 and a tablet 26 for inputting various instructions and data, a CRT 28, secondary memory 30 such as a drive of floppy disk, optomagnetic disk, etc., and an embroidery machine 32.

The ROM 14, etc. of the embroidery data generator 10 is used to form an outline data generator 40, a center line generator 42, a branch and end points search unit 44, a closure generator 46, an orientation determiner 48, all of which will be described later, a needle point determiner 50 for determining needle points, and others. In addition to these programs, an editor 52 for retouching the embroidery data, etc. and other programs are stored in the ROM 14. These programs perform their jobs with the assistance given by the CPU 12. These means can be realized not only as programs but as dedicated ICs or the like such as digital signal processors.

The RAM 16 stores data obtained from the processing by the CPU 12 with the usage of various means and programs provided by the ROM 14. It has memory areas for the respective areas: an area 60 for storing image data of embroidery patterns scanned by the scanner, etc., a memory area 62 for outlines of the embroidery patterns, a memory area 64 for center lines, a memory area 66 for branch and end points data, a memory area 68 for closure data, a memory area 70 for orientation data, a memory area 72 for embroidery data, and other areas. In place of the RAM 16, a floppy disk or the like of the secondary memory 30 may be used.

Figure 2:
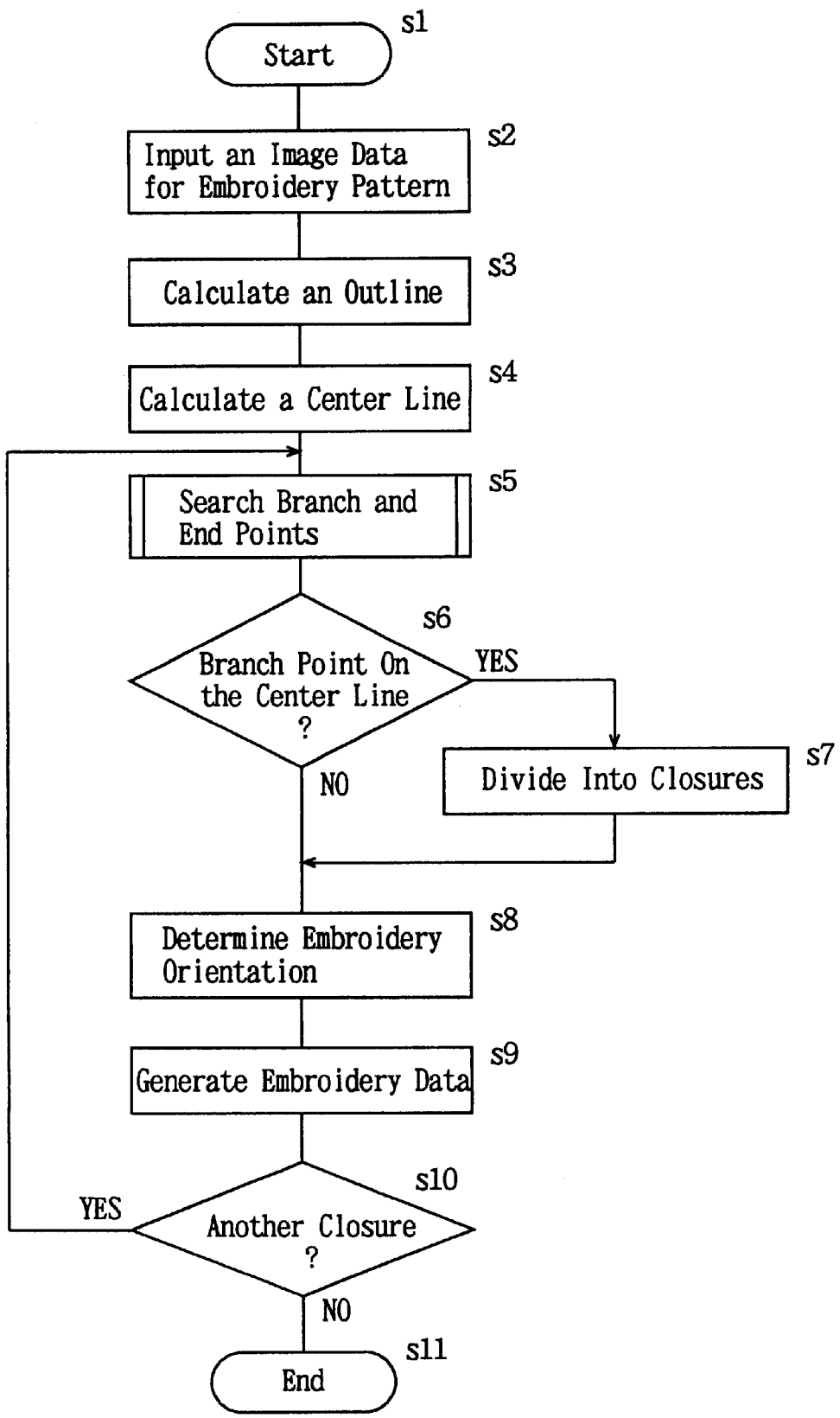
FIG. 2 is a flowchart showing the entire fill operation of the embodiment of the present invention.
Figure 3:
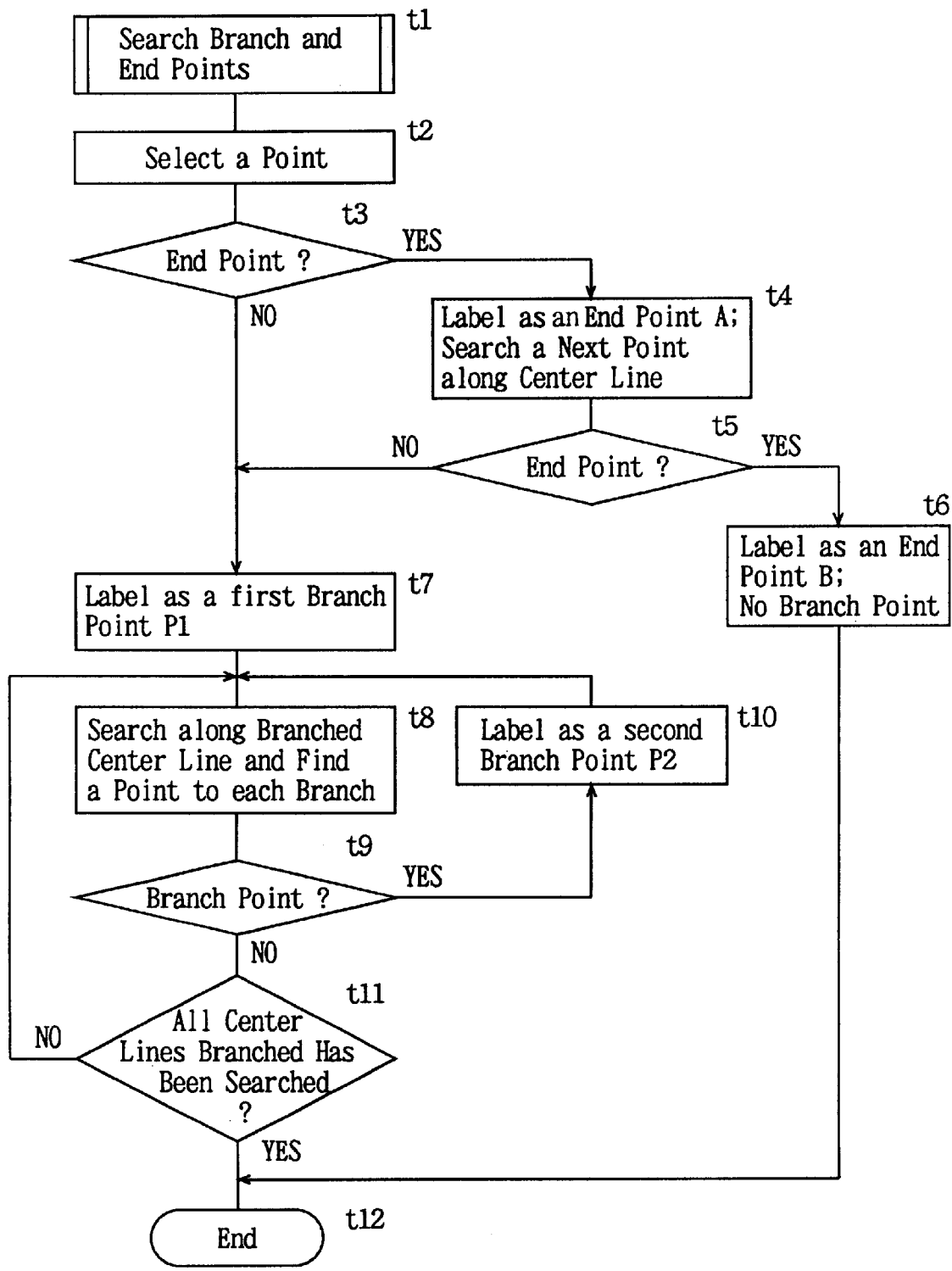
FIG. 3 is a flowchart showing the branch and end points searching process.
Figure 4A:
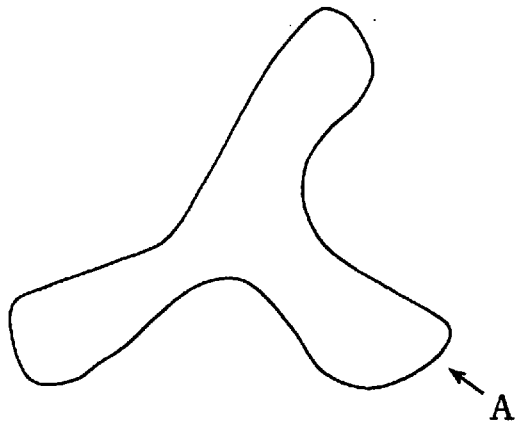
FIGS. 4(A), 4(B), 4(C), 4(D), 4(E) are diagrams showing an embroidery region for explaining the fill operation in Embodiment 1.
Figure 4B:
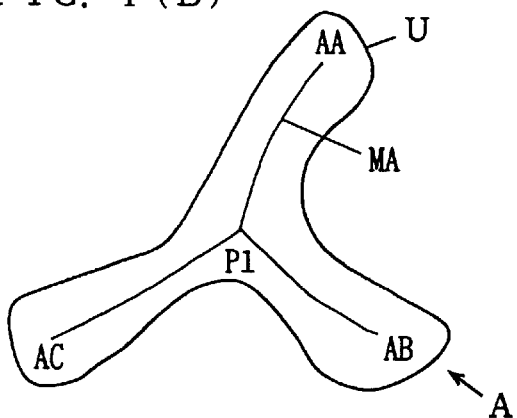
Figure 4C:
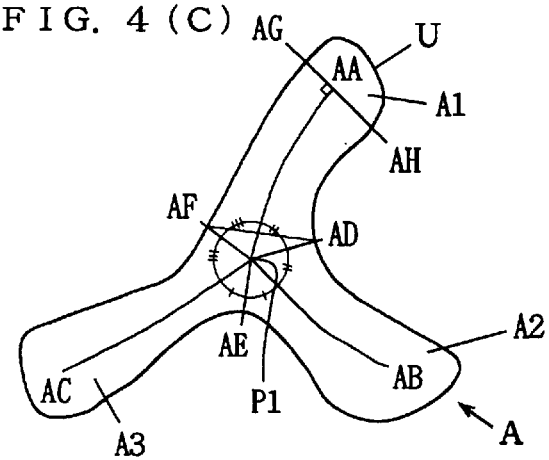
Figure 4D:
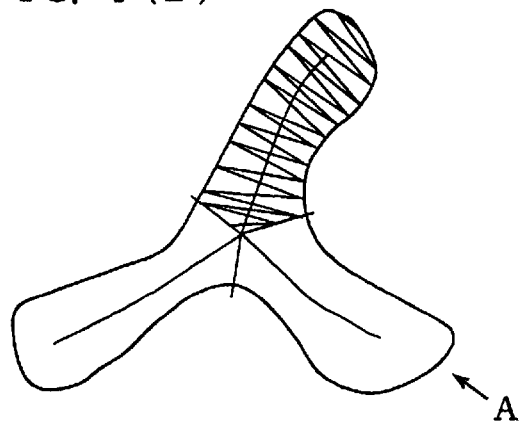
Figure 4E:
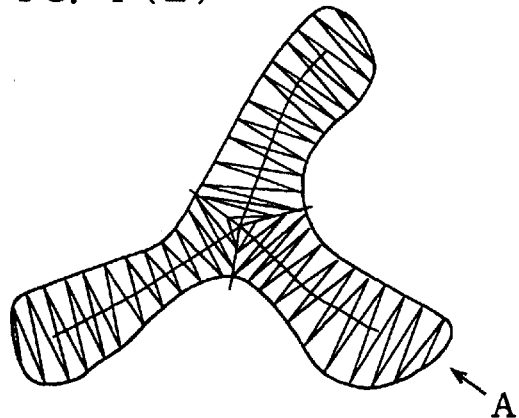

Next, in the fill operation of the embroidery data generator according to the present invention, embroidery data are generated so that the embroidery region is fill up with embroidery lines corresponding to the shape of the embroidery region. With reference to the flowcharts of FIG. 2 and FIG. 3, the fill operation will be explained. FIG. 2 is a flow chart showing the entirety of the fill operation of the present invention, and FIG. 3 is a detailed flowchart showing the search of branch and end points.

The process starts with the step s1. In the step s2 the operator sets the original drawing of the embroidery pattern on the scanner 22 to scan the image data of the embroidery pattern, store them in the area 60 of the RAM 16, and make the CRT 28 display the image data.

In this embodiment, the original drawing of the embroidery pattern is scanned by the scanner as image data. However, the embroidery pattern may be drawn by the stylus 24 and the tablet 26.

In the step s3, the outline is computed by the outline data generator 40 from the image data of the embroidery pattern inputted in the step s2, and stored in the RAM 16.

In the step s4, the center line M of the embroidery region is computed by the center line generator 44 from the outline obtained in the step s3, and it is stored in the RAM 16 as the center line data.

In the step s5, the branch and end points search unit 44 searches the center line data obtained in the step s4 for any branch point P or end points, and stores them as branch and end point data. In the step s6, judgement is made whether the center line data has a branch point P or not. When an affirmative judgement is made, the step proceeds to the step s7.

Now, with reference to the flowchart of FIG. 3, a more detailed explanation is given regarding the process of the branch and end points search unit 44 in the step s5.

In FIG. 3, the branch and end points search process starts in the step t1. In the step t2, either a branch point P or an end point is found for the center line M. In the step t3, judgement is made whether the point obtained in the step s2 is an end point or a branch point P. When it is an end point, the step will proceed to the step t4, and the point found in the step t2 will be made as an end point A. Then the center line M is traced to find a branch point P or an end point. In the step t5, judgement is made whether the point found in the step t4 is an end point or a branch point P. When the judgement is that the point is an end point, the step will proceed to the step t6, and the point will be made as an end point B, and the region will be judged to be free of any branch point P, and the branch and end points search is completed in the step t12.

In the step t5, when the point obtained in the step t4 is judged to be a branch point P rather than an end point, the step proceeds to the step t7. In the step t3, when the point obtained in the step t2 is judged to be a branch point P, the step will proceed to the step t7.

In the step t7, the point obtained in the step t3 or the step t5 is made the first branch point P1. In the step 8, the center line M branching at the branch point P1 is searched for branch and end points, and points as many as that of the branches will be obtained. In the step t9, judgement is made whether one point obtained in the step t8 is a branch point P or an end point. When the point is a branch point P, the step will proceed to the step s10 and the point will be made a second branch point P2, and the step will go back to the step t8. In the step s10, if the point obtained is a third branch point, the point will be made P3, and if the point obtained is a fourth branch point, the point will be made P4. In the step t9, when the point is judged not to be a branch point P but an end point, judgement will be made, in the step t11, whether all the branched center lines M have been processed. If any center line M remains to be processed, the step will go back to the step t8 again, and when all the center lines M have been processed, the step will proceed to the step t12 to complete the branch and end points search process.

With reference to FIG. 2 again, the step s7 will be explained. When judgement is made that a branch point P is present on the center line M as a result of the search by the branch and end points search unit 44 of FIG. 3, the closure generator 46 will compute intersection points of a dividing line, which bisects the space between the branches in the embroidery region at the branch point P on the center line, and the outline. The region configured by the outline will be divided into plural closures by the dividing lines connecting the respective computed intersection points and the branch point P. The respective closures are stored in the RAM 16 as closure data.

In the step s5, when judgement is made that the center line M is free of any branch point P, the region will be judged to free of any branching, and the closure generating process of the region by the closure generator 46 will be omitted. In the step s8, the orientation determiner 48 examines the dividing line that angularly bisects the space between two branches of the center line M at the branch point P. The line connecting the two intersection points of the dividing lines and the outline is made the embroidery orientation on one side of the closure. A vertical line, at the end point of the closure, to the center line is made the other embroidery orientation. The orientations of embroidery lines are determined to interpolate these embroidery orientations. The embroidery lines thus obtained are stored in the RAM 16.

In the present embodiment, each embroidery orientation near the branch point is made parallel to the line connecting two intersection points of the dividing lines and the outline so as to coordinate the respective closures near the branch point. In place of this, each embroidery orientation may be determined on the basis of the perpendicular line from the branch point P onto the outline.

In the present embodiment, the embroidery orientation at the end point of the closure is made perpendicular to the center line, but the embroidery orientation may be tilted from the perpendicular line to the center line. It also applies to the line connecting the two intersection points near the branch point.

Depending on the shape of the embroidery region, the number of embroidery orientations may be increased from two, and perpendicular lines at several points on the center line may be defined as the embroidery orientations. A large number of embroidery lines are generated by the fill operation, and their orientations are made to interpolate the above-mentioned embroidery orientations.

In the step s9, the needle point determiner 50 the needle points of each closure for the embroidery machine on the basis of the embroidery density data stored in the RAM 16 but not displayed. This process uses the division into closures in the step s7 and the embroidery orientations determined in the step s8, and the needle points are stored in the RAM 16.

In the step s10, judgement is made whether another closure that requires fill operation is present. If another closure is present, the step will return to the step s5. If no new closure is present, the step will proceed to the step s 11 to complete the fill operation.

Thus every region can be filled up with embroidery lines corresponding to the outline thereof.

Next, with regard to the actual embroidery region A shown in FIG. 4 (A), the process of the fill operation will be explained. First, the image data of the original drawing of the embroidery region A are inputted by the scanner 22. The outline data generator 40 computes the outline shown in FIG. 4 (B) from the inputted image data. Then the center line generator 42 determines the center line MA of the embroidery region on the basis of the outline.

The branch and end points search unit 44 processes the center line data thus obtained to find either an end point or a branch point P on the center line MA. Let us suppose here that a point AA on the center line MA is obtained first. The point AA is and end point, and is labelled as the end point AA. The center line MA is traced from the end point AA to find a branch point P1. At the branch point P1, respective branches of the center line MA are searched, and end points AB and AC are found.

The closure generator 46 finds dividing lines that bisect the respective spaces between branches at the branch point P1, then determines the intersection points AD, AE and AF of these dividing lines and the outline U. The region is divided by the dividing lines P1-AD, P1-AE and P1-AF connecting the respective intersection points AD, AE and AF and the branch point P1 into three closures A1, A2 and A3: the closure A1 containing the branch AA-P1 and being divided by the dividing lines AD-P1-AF, the closure A2 containing the branch AB-P1 and being divided by the dividing lines AD-P1-AE, and the closure A3 containing the branch AC-P1 and being divided by the dividing lines AE-P1-AF.

The orientation determiner 48 computes, for example, the embroidery orientations of the closure A1 having the branch AA-P1 and being divided by the dividing lines AD-P1-AF. A perpendicular line AG-AH to the branch AA-P1 at the end point AA is made the embroidery orientation near the point. The embroidery orientation near the branch point is defined to be the straight line AD-AF connecting two intersection points of the dividing lines AD-P1 and AF-P1 bisecting the spaces between branches at the branch point P1 and the outline U. The orientations of the embroidery lines in the closure A1 are determined so as to interpolate the two embroidery orientations AG-AH and AF-AF. The needle point determiner 50 determines the needle points in the closure A1 as shown in FIG. 4 (D) on the basis of the closure and the embroidery orientations and develops embroidery data. Similar processes are done for the remaining closures A2 and A3 to make the fill operation for the entire region as shown in FIG. 4 (E).

As a second embodiment, the fill operation for a case wherein the center line M of a region formed by the outline of the embroidery region has two or more branch points P (the embroidery region B of FIG. 5 (A)) will be explained.

Figure 5A:
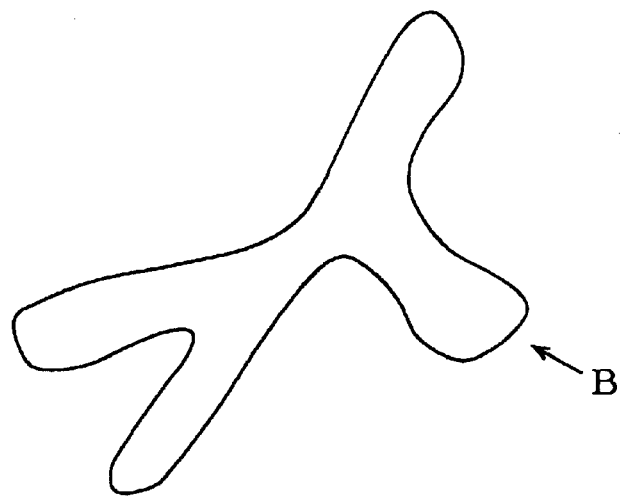
FIGS. 5(A), 5(B), 5(C) are diagrams showing an embroidery region for explaining the fill operation in Embodiment 2.
Figure 5B:
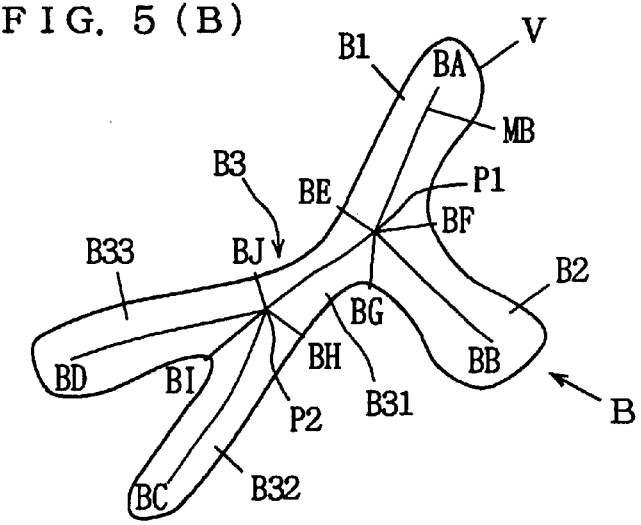
Figure 5C:
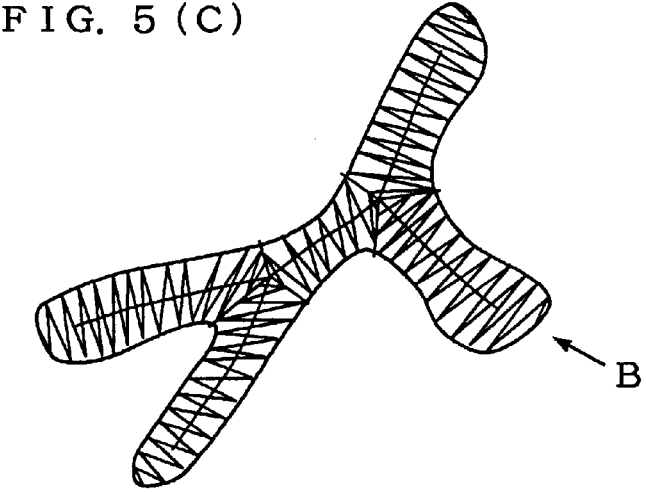

The outline V is computed by the outline data generator 40 and the center line is computed by the center line generator 42 for the embroidery region B of FIG. 5 (A) just as done for the embroidery region of FIG. 4 (A). Then, with regard to the embroidery region B of FIG. 5 (A), two branch points P1 and P2 and four end points BA, BB, BC and BD are found on the center line MB by the branch and end points search unit 44. The closure generator 46 determines dividing lines bisecting the spaces between branches P1-BA, P1-BB and P1-P2 at the branch point P1, and finds the intersection points BF, BG and BE of the dividing lines and the outline V. The embroidery region is divided by the dividing lines P1-BF, P1-BG and P1-BE connecting the respective intersection points BF, BG and BE and the branch point P1 into three closures B1, B2 and B3; the closure B1 containing the branch P1-BA and being divided by the dividing lines BF-P1-BE, the closure B2 containing the branch P1-BB and being divided by the dividing lines BF-P1-BG, and the closure B3 containing the branch P2-P1 and being divided by the dividing lines BE-P1-BG.

Since the region containing the branches P1-P2-BC and BD contains the branch point P2, intersection points BH, BI and BJ at which the bisectors for the spaces between the branches P2-P1, P2-BC and P2-BD at the branch point P2 cross the outline V are determined. The closure B3 is further divided into three closures B31, B32 and B33 containing the branches P2-P1, P2-BC and P2-BD respectively by the dividing lines P2-BH, P2-BI and P2-BJ connecting the respective intersection points BH, BI and BJ and the branch point P2.

Of the various closures, for the closures B1, B2 and B32 and B33, the embroidery orientations are computed and the needle points are determined for the closures in a manner similar to that of the above-mentioned first embodiment. Ends of the closure B31 containing the branch P1-P2 are at two branch points P1 and P2. Hence the first embroidery orientation is BE-BG connecting the intersection points at which the dividing lines P1-BE and P1-BG bisecting the spaces between branches cross the outline V, and the other embroidery orientation is BH-BJ. The orientations of the embroidery lines for the closure B31 are determined to interpolate the two embroidery orientations BE-BG and BH-BJ. Then the needle points are determined by the needle point determiner. The results of the fill operation for the entirety of the embroidery region B are shown in FIG. 5 (C).

Figure 6:
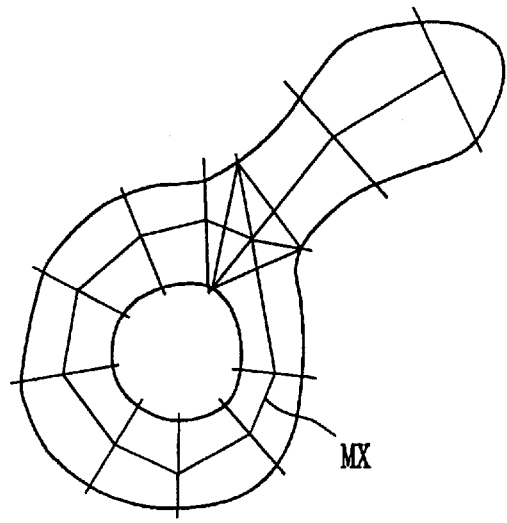
FIG. 6 is a diagram showing an embroidery region having one vacant space inside the embroidery region.

In these fill operations, when the pattern has a vacant hole in it as shown in FIG. 6, the center line MX will be a circle. In this case, if the orientation determiner 48 computes the embroidery orientations at appropriate plural points on the center line MX, the embroidery region can be filled with embroidery lines corresponding to the shape thereof. Here the points at which embroidery orientations are designated may be specified by the user by means of the stylus 24, etc. Or the orientation of the center line MX may be monitored by the orientation determiner 48, and for every change in the orientation by several tens of degrees, a new embroidery orientation may be generated.

Figure 7A:
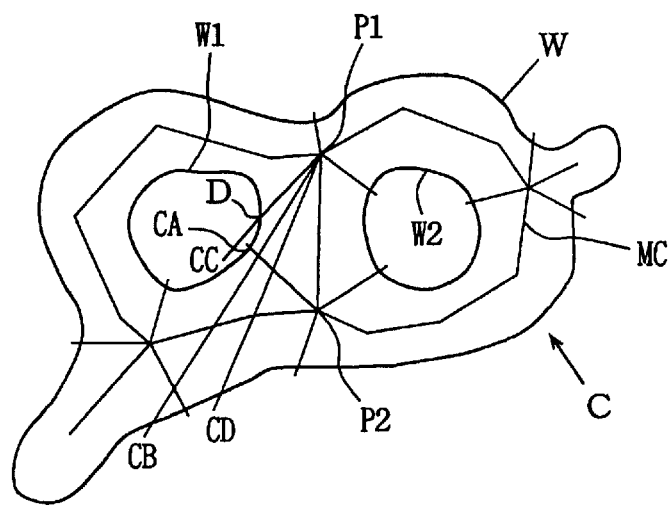
FIGS. 7(A), 7(B) are diagrams showing the fill operation in Embodiment 3.
Figure 7B:
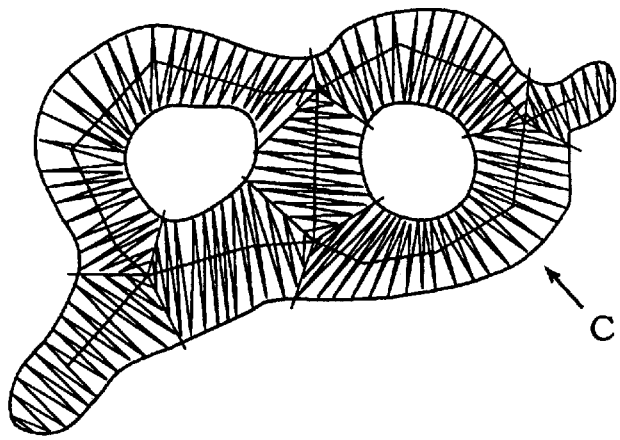
Figure 8:
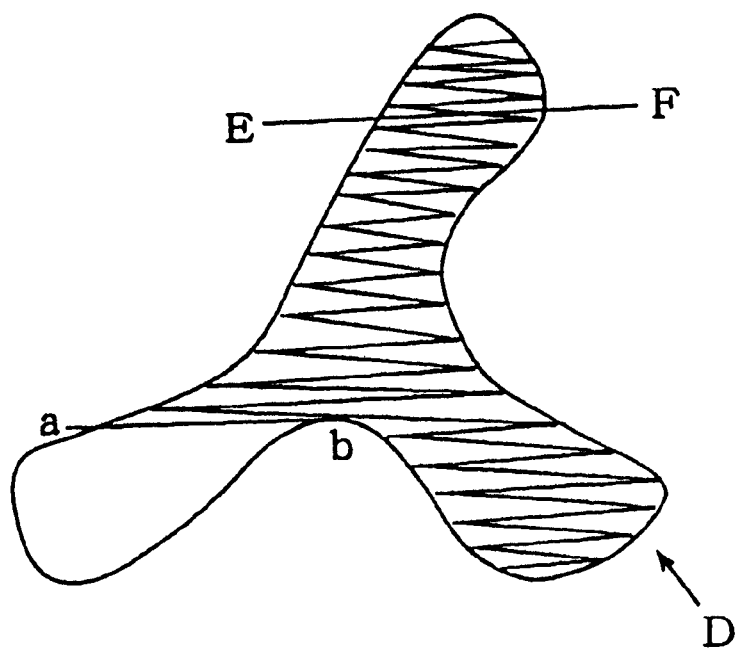
FIG. 8 is a diagram showing the development of embroidery data in conventional cases.
Figure 9:
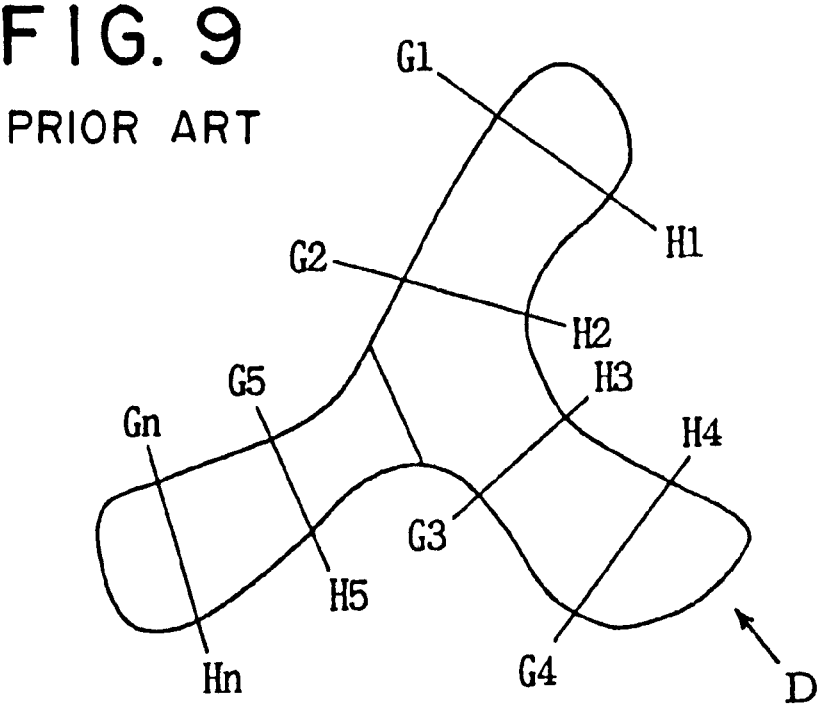
FIG. 9 is a diagram showing the input of embroidery orientations in conventional cases.

As a third embodiment, a case of fill operation for an embroidery region C shown in FIG. 7 (A) will be explained. In the embroidery region used in the above-mentioned fill operation, the dividing lines bisecting the spaces between the branches first crossed with the outline. However, in the embroidery region C of FIG. 7 (A), if the spaces between branches are bisected at the branch point P1 on the center line MC, the dividing lines will cross another dividing line P2-CA before crossing the outline W; thus the region can not be divided properly. Then the closure generator 46 turn the dividing line P1-CB bisecting the space between branches clockwise or counterclockwise around the branch point P1 to obtain dividing lines P1-CC and P1-CD. The dividing line P1-CC crosses the outline W1 at the intersection point D. Then the dividing line at the branch point 1 is determined to be a segment P1-D. FIG. 7 (B) shows the entirety of the embroidery region C for which the fill operation was made just as done in the above-mentioned embodiment.

The image data of the embroidery region were inputted by the scanner 22 in the embodiments, but the image data may be inputted by taking the picture with a TV camera, etc. in place of the scanner 22. Image data of an embroidery region stored on a floppy disk may be inputted by means of the secondary memory 30.

Preferred embodiments of the present invention were described. However, the present invention is not limited to the above-mentioned embodiments, and can be effected as far as one observes the gist of the invention.

The invention claimed is:

1. An embroidery data generator for determining needle points of embroidery lines in an embroidery region, said embroidery data generator comprising:

outline data generating means for determining an outline of the embroidery region;

computing means for computing characteristic lines that are present inside the outline obtained and to interpolate orientations of opposing portions of the outline;

branch point and end point search means for searching for branch points and end points on the characteristic lines obtained;

closure generating means for dividing the embroidery region into plural closures by dividing lines where the dividing lines divide the embroidery region into plural closures near the branch points searched for;

orientation determining means for computing the embroidery orientation, at least for some positions, on the basis of orientations of said characteristic lines; and needle point determining means for determining needle points of the embroidery lines, on the basis of the embroidery orientations obtained and said outline and said dividing lines.

2. An embroidery data generator of claim 1 comprising said means for computing the characteristic lines computes a center line of the outline.

3. An embroidery data generator of claim 2 comprising said closure generating means determines bisectors of the spaces between center lines near said branch point and makes the bisecting lines said dividing lines.

4. An embroidery data generator of claim 1 comprising said closure generating means further computes intersection points of the dividing lines and the outline.

5. An embroidery data generator of claim 4 comprising said closure generating means makes the dividing lines start from each branch point, and searches for intersections along the dividing lines starting from the branch point with other graphic characteristics, and when the first intersection is with any characteristics other than the outline, said closure generator rotates said dividing line on said branch point till the first intersection is with the outline.

6. An embroidery data generator of claim 1 comprising said orientation determining means determines the orientations of the embroidery lines at least at two points on the characteristic lines in the closure, and for at least one of the points, determines the embroidery orientation on the basis of the orientation of the characteristic line near said point, and determines the orientations of embroidery lines in other positions so that they interpolate between at least the two embroidery orientations determined.

7. An embroidery data generator of claim 6 comprising said orientation determining means determines the embroidery orientation at said at least one point substantially perpendicular to the characteristic line.

8. An embroidery data generator of claim 7 comprising said orientation determining means determines, at least one point on the characteristic lines in the closure, the first orientation of embroidery lines substantially perpendicular to the characteristic line, finds two intersection points of the dividing lines and the outline near the branch point, determines a second embroidery orientation substantially parallel to the direction connecting said two intersection points, and determines the orientations of embroidery lines in other positions so that they interpolate between these first and second embroidery orientations.

* * * * *